(12) United States Patent
Margheritti

(10) Patent No.: US 11,220,850 B2
(45) Date of Patent: Jan. 11, 2022

(54) AUTOMOTIVE LATCH WITH PULLEY FOR FLEXIBLE CABLE ROUTING

(71) Applicant: Magna Closures S.p.A., Guasticce (IT)

(72) Inventor: Enrico Margheritti, Lucca (IT)

(73) Assignee: MAGNA CLOSURES S.P.A., Guasticce (IT)

( * ) Notice: Subject to any disclaimer, the term of this patent is extended or adjusted under 35 U.S.C. 154(b) by 661 days.

(21) Appl. No.: 15/258,225

(22) Filed: Sep. 7, 2016

(65) Prior Publication Data

US 2017/0089105 A1 Mar. 30, 2017

Related U.S. Application Data

(60) Provisional application No. 62/234,273, filed on Sep. 29, 2015.

(51) Int. Cl.
*E05C 3/16* (2006.01)
*E05B 81/20* (2014.01)
*E05B 79/20* (2014.01)
*E05B 85/02* (2014.01)
*F16H 37/12* (2006.01)

(52) U.S. Cl.
CPC .............. *E05C 3/16* (2013.01); *E05B 79/20* (2013.01); *E05B 81/20* (2013.01); *E05B 85/02* (2013.01); *F16H 37/12* (2013.01); *Y10T 292/108* (2015.04); *Y10T 292/1047* (2015.04); *Y10T 292/1082* (2015.04); *Y10T 292/1092* (2015.04)

(58) Field of Classification Search
CPC . E05C 3/16; E05B 79/20; E05B 81/20; E05B 85/02; F16H 37/12; Y10T 292/108; Y10T 292/1092; Y10T 292/1047; Y10T 292/1082
See application file for complete search history.

(56) References Cited

U.S. PATENT DOCUMENTS 4,848,809 A * 7/1989 Escaravage ............. E05B 81/20
292/11
4,907,474 A * 3/1990 Bolger .................. F16H 33/185
475/14

(Continued)

FOREIGN PATENT DOCUMENTS

EP 1518984 A1 * 3/2005 ............. E05B 81/36
WO WO-2015006859 A1 * 1/2015 ......... B60N 2/01516

*Primary Examiner* — Kristina R Fulton
*Assistant Examiner* — Faria F Ahmad
(74) *Attorney, Agent, or Firm* — Dickinson Wright PLLC

(57) ABSTRACT

A latch assembly for a closure member is provided. The latch assembly includes a housing and a ratchet pivotally coupled to the housing for selectively retaining a striker to secure the closure member. A cinch lever assembly is coupled to the housing and includes a cinch lever for engaging the ratchet. The cinch lever cinches the striker in the ratchet in response to the cinch lever being actuated by a cable coupled to the cinch lever assembly to move the closure panel from a partially closed position to a fully closed position. A cinch subassembly is operatively coupled to the cinch lever assembly with the cable coupled to the cinch lever assembly. The cinch subassembly is configured to freely move between a plurality of positions relative to the housing to accommodate a plurality of orientations of the cable coupled to the cinch lever assembly.

13 Claims, 11 Drawing Sheets

(56) References Cited

U.S. PATENT DOCUMENTS

| | | | | |
|---|---|---|---|---|
| 5,316,365 | A * | 5/1994 | Kuhlman | B60J 5/06 296/155 |
| 5,319,881 | A * | 6/1994 | Kuhlman | E05F 15/646 49/138 |
| 5,639,130 | A | 6/1997 | Rogers, Jr. et al. | |
| 5,833,301 | A * | 11/1998 | Watanabe | E05F 15/646 296/155 |
| 5,918,917 | A | 7/1999 | Elton et al. | |
| 6,009,671 | A * | 1/2000 | Sasaki | E05F 15/41 296/146.1 |
| 6,053,542 | A | 4/2000 | Ostrowski et al. | |
| 6,123,372 | A | 9/2000 | Rogers, Jr. et al. | |
| 6,125,583 | A | 10/2000 | Murray et al. | |
| 6,247,373 | B1 * | 6/2001 | Bree | E05B 81/20 73/862.381 |
| 6,341,448 | B1 | 1/2002 | Murray et al. | |
| 6,550,825 | B2 | 4/2003 | Ostrowski et al. | |
| 6,925,757 | B2 * | 8/2005 | Priest | E05F 15/646 242/388.8 |
| 7,003,915 | B2 * | 2/2006 | Yokomori | E05F 15/603 49/280 |
| 7,175,212 | B2 | 2/2007 | Cetnar et al. | |
| 7,575,270 | B2 * | 8/2009 | Nagai | E05B 81/20 296/146.4 |
| 7,854,093 | B2 * | 12/2010 | Yoshida | E05F 15/646 49/360 |
| 7,856,759 | B2 * | 12/2010 | Elliott | E05D 15/58 49/358 |
| 7,905,523 | B2 * | 3/2011 | Stefanie | E05B 79/20 292/201 |
| 8,127,497 | B2 * | 3/2012 | Rogers | E05F 15/646 49/360 |
| 8,225,552 | B2 * | 7/2012 | Yokomori | E05F 15/646 49/360 |
| 2002/0093207 | A1 * | 7/2002 | Ehret | E05B 81/20 292/216 |
| 2003/0136054 | A1 * | 7/2003 | Daniels | E05F 15/627 49/340 |
| 2004/0195419 | A1 * | 10/2004 | Yamagishi | E05F 15/646 242/365.6 |
| 2004/0245786 | A1 * | 12/2004 | Hashiba | E05B 81/66 292/216 |
| 2005/0121922 | A1 | 6/2005 | Cetnar et al. | |
| 2005/0284201 | A1 * | 12/2005 | Kachouh | B60N 2/0232 70/416 |
| 2006/0220416 | A1 | 10/2006 | Mrkovic et al. | |
| 2007/0138802 | A1 * | 6/2007 | Stasko | E05B 79/20 292/201 |
| 2007/0163179 | A1 * | 7/2007 | Fukumura | H02K 7/116 49/360 |
| 2009/0145182 | A1 * | 6/2009 | Bettin | E05B 81/20 70/237 |
| 2016/0186468 | A1 * | 6/2016 | Ilea | E05B 83/18 292/201 |
| 2018/0258671 | A1 * | 9/2018 | Graute | E05B 81/50 |
| 2018/0283057 | A1 * | 10/2018 | Stojc | E05B 81/08 |
| 2018/0355640 | A1 * | 12/2018 | Jeong | E05B 77/265 |
| 2018/0355641 | A1 * | 12/2018 | Kothe | E05B 79/10 |

* cited by examiner

AUTOMOTIVE LATCH WITH PULLEY FOR FLEXIBLE CABLE ROUTING

CROSS REFERENCE TO RELATED APPLICATION

This application claims the benefit of U.S. Provisional Application Ser. No. 62/234,273 filed Sep. 29, 2015, which is incorporated herein by reference in its entirety.

FIELD

The present invention relates to a latch and cinch assembly for securing and unsecuring a vehicle closure panel. More specifically, the present disclosure relates to a latch and cinch assembly for securing and unsecuring a vehicle closure panel featuring a rotatable cinch pulley.

BACKGROUND

This section provides background information related to the present disclosure which is not necessarily prior art.

A typical motor vehicle door is mounted in a door frame on the vehicle and is movable between open and closed positions. Usually the door is held in a closed position by a latching engagement between a spring-biased ratchet pivotally mounted inside the door latch and a U-shaped striker secured to the door frame. The ratchet is most often spring-biased toward the unlatched position to release the striker and is maintained in the latched position to hold the striker by a spring-biased pawl or other mechanical structure. The ratchet cannot pivot to release the striker until the pawl is moved.

Power assisted door latch assemblies have been developed to overcome problems associated with latching doors with lightweight construction and hard door seals. Power assisted door latch assemblies allow low internal energy or soft closure of the lightweight doors without the need to slam the door even with increased seal pressure resulting from relatively hard door seals.

Designing a latch assembly with a cinch function to provide soft closure has proven difficult because of the position and the orientation of the soft close Bowden cable and the Bowden cable attachment on the latch frame plate or housing. Current state of the art systems orient the Bowden cable downward because, when placed in a door, the soft close latch assembly is most often close to the window trim line and there is limited space on the door to place a soft close remote actuator above the latch.

In addition to this, it has also proven difficult to package soft close latch assemblies because of the extension of the latch in the Z and Y directions. Some current latch assemblies position the ratchet above the fish-mouth while other systems position the ratchet below the fish mouth. In both instances, finding a convenient Bowden cable position and attachment point while satisfying the above mentioned packaging requirements is difficult.

Accordingly, there remains a need for improved latch assemblies with a cinch function providing for flexible ratchet and Bowden cable orientation without complicating the packaging requirements of the latch assembly.

SUMMARY

This section provides a general summary of the present disclosure and is not a comprehensive disclosure of its full scope or all of its features and advantages.

Accordingly, it is an aspect of the present disclosure to provide a latch assembly for a closure member. The latch assembly includes a housing and a ratchet pivotally coupled to the housing for selectively retaining a striker to secure the closure member. A cinch lever assembly is coupled to the housing and includes a cinch lever for engaging the ratchet. The cinch lever cinches the striker in the ratchet in response to the cinch lever being actuated by a cable coupled to the cinch lever assembly to move the closure panel from a partially closed position to a fully closed position. A cinch subassembly is operatively coupled to the cinch lever assembly with the cable coupled to the cinch lever assembly. The cinch subassembly is configured to freely move between a plurality of positions relative to the housing to accommodate a plurality of orientations of the cable coupled to the cinch lever assembly.

According to another aspect of the disclosure a latch assembly is provided. The latch assembly includes a housing configured to receive a striker. A ratchet includes a slot and is pivotally mounted on the housing for retaining the striker in a latched position. A pawl is pivotally mounted on the housing for selectively retaining the ratchet in the latched position. A cinch lever assembly is mounted on the housing. The cinch lever assembly has a cinch lever for cinching the striker in the slot in response to the ratchet being in the latched position. A pulley is mounted on the housing and rotatable about an axis of rotation to guide a cable coupled to the cinch lever assembly in an attachment direction. The cable is for actuating the cinch lever. A cable attachment bracket is hingedly coupled to the housing at a hinge point adjacent to the pulley for attaching the cable thereto and thereby variably orienting the cable in a direction differing from the attachment direction of the cable to the cinch lever assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

It will be noted that throughout the appended drawings, like features are identified by like reference numerals.

DETAILED DESCRIPTION

In the following description, details are set forth to provide an understanding of the present disclosure. In some instances, certain systems, structures and techniques have not been described or shown in detail in order not to obscure the disclosure.

In general, the present disclosure relates to a latch and cinch assembly for securing and unsecuring a vehicle closure panel. The latch and cinch assembly of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure.

Referring to the Figures, wherein like numerals indicate corresponding parts throughout the several views, embodiments of the latch and cinch assembly are described below, by way of example, with reference to FIGS. 1 to 12. The embodiments described and depicted herein provide a latch assembly incorporating a rotatable cinch pulley. Specifically, the latch assemblies disclosed incorporate a cinch pulley and a hinged a cable attachment bracket hingedly coupled to the housing at a hinge point adjacent to the pulley.

Figure 1:
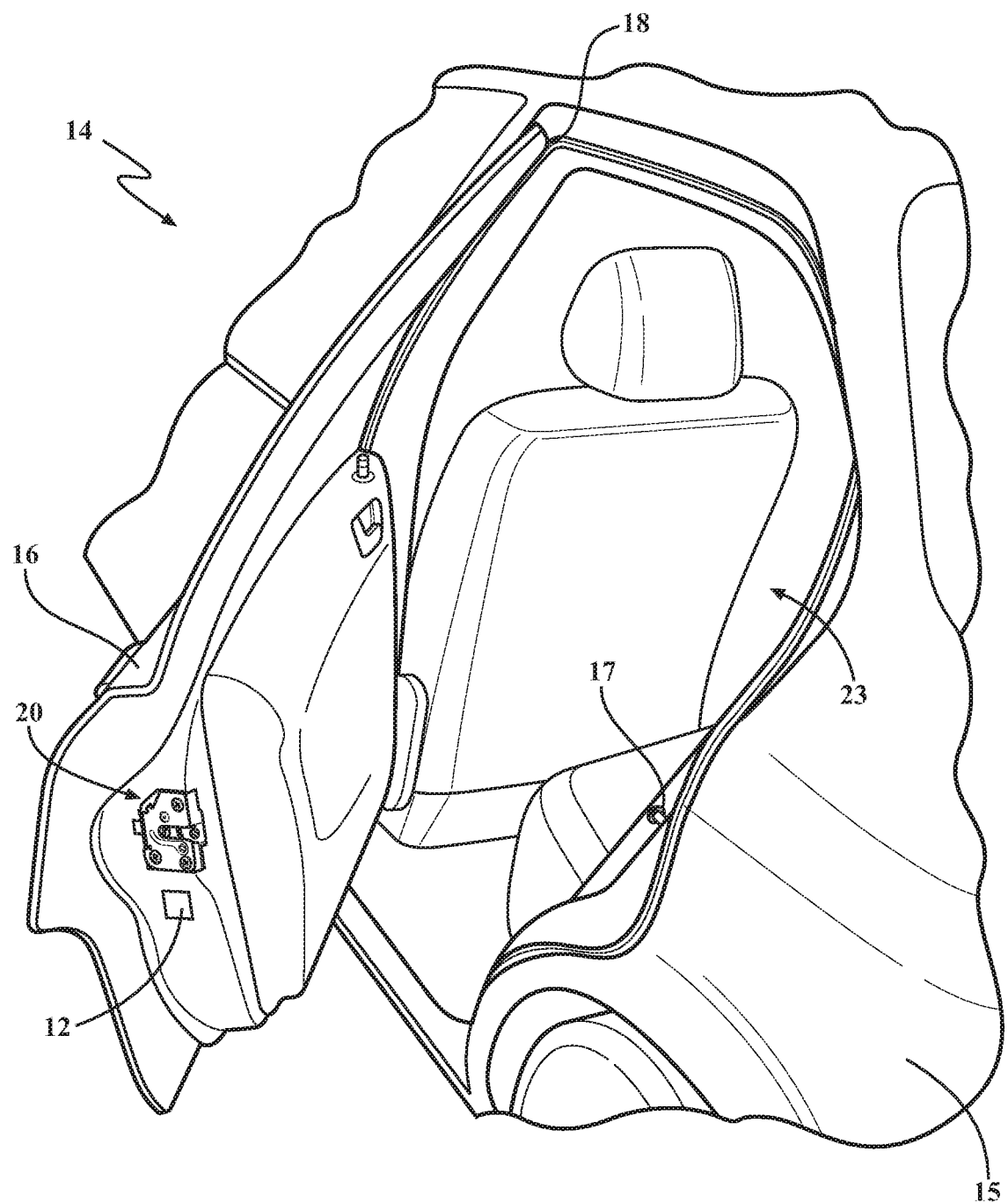
FIG. 1 shows a perspective view of an example vehicle with a vehicle body having one or more closure panels according to aspects of the disclosure.

Referring to FIG. 1, a vehicle 14 is generally shown, with a vehicle body 15 having one or more closure panels 16 coupled to the vehicle body 15. The closure panel 16 is connected to the vehicle body 15 via one or more hinges 18 and a latch assembly 20 (e.g., for retaining the closure panel 16 in a closed position once closed). It is also recognized that the hinge 18 can be configured as a biased hinge 18 to bias the closure panel 16 towards an open position and/or towards the closed position. As such, the hinge 18 can also incorporate one or more actuated struts to assist in opening and closing of the closure panel 16, as desired. The closure panel 16 has a latch assembly 20 mounted thereon for mating with striker 17 mounted on the body 15.

Movement of the closure panel 16 (e.g., between open and closed panel positions) can be electronically and/or manually operated by a latch controller 12, where power assisted closure panels 16 can be found on minivans, high-end cars, or sport utility vehicles (SUVs) and the like. As such, it is recognized that movement of the closure panel 16 can be manual or power assisted (e.g., using electronic latch controller 12) during operation of the closure panel 16 at, for example: between fully closed (e.g., locked or latched) and fully open (e.g., unlocked or unlatched); between locked/latched and partially open (e.g., unlocked or unlatched); and/or between partially open (e.g. unlocked or unlatched) and fully open (e.g. unlocked or unlatched). It is recognized that the partially open configuration of the closure panel 16 can also include a secondary lock (e.g., closure panel 16 has a primary lock configuration when fully closed and a secondary lock configuration when partially open). For instance, latch assemblies 20 associated with vehicle hoods may include such a secondary lock to prevent unintended opening of the hood.

The closure panel 16 may be a hood, a lift gate, or it may be some other kind of closure panel 16, such as, but not limited to an upward-swinging vehicle door (i.e., a gull-wing door) or a conventional type of door that is hinged at a front-facing or back-facing edge of the door. This type of conventional door arrangement can allow the door to swing (or slide) away from (or towards) the opening 23 in the body 15 of the vehicle 14. Also contemplated are sliding door embodiments of the closure panel 16 and canopy door embodiments of the closure panel 16. Thus, sliding doors used in conjunction with the latch assembly of the present disclosure can be a type of door that opens by sliding horizontally or vertically, whereby the door is either mounted on, or suspended from a track that provides for a larger opening 23 for equipment to be loaded and unloaded through the opening 23 without obstructing access. Canopy doors are a type of door that sits on top of the vehicle 14 and lifts up in some way, to provide access for vehicle passengers via the opening 23 (e.g. car canopy, aircraft canopy, etc.). Canopy doors can be connected (e.g. hinged at a defined pivot axis and/or connected for travel along a track) to the body 15 of the vehicle at the front, side or back of the door, as the application permits. It is recognized that the body 15 can be represented as a body panel of the vehicle 14, a frame of the vehicle 14, and/or a combination frame and body panel assembly, as desired.

Referring to FIGS. 2-12, latch assembly 20 includes a number of latch elements (e.g., ratchet 24 and pawl 25) that are configured to cooperate with striker 17 to retain striker 17 within a slot 13 (see FIG. 3 for slot 13 of ratchet 24) when the closure panel 16 is in the closed position (e.g., locked), or otherwise to drive striker 17 out of the slot 13 when the closure panel 16 is in the open position. The slot 13 is sized for receiving the striker 17 therein, in other words the slot 13 of ratchet 24 of latch assembly 20 is configured for receiving a keeper or striker 17. Pawl 25 and ratchet 24 and are pivotally secured to housing 29 via shafts or pins 26, 28, respectively. The ratchet 24 includes two arms spaced apart to define a generally u-shaped slot 13 there between (see FIGS. 3-8).

Figure 2:
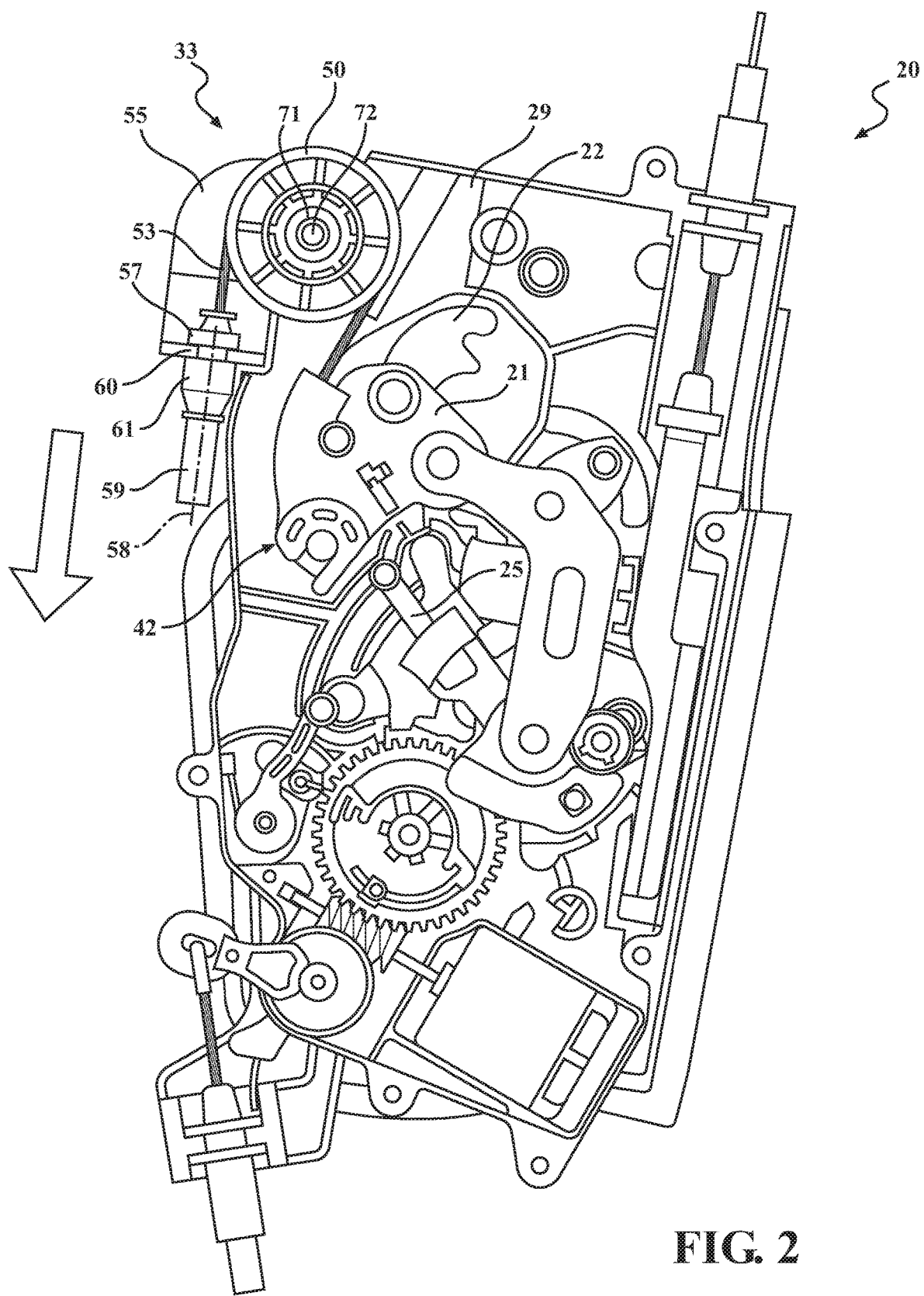
FIG. 2 shows a cross-sectional view of a latch assembly in a first orientation according to aspects of the disclosure.

Referring to FIG. 2, a cinch lever assembly 42 is shown mounted to housing 29 and coupled to a rotary actuator system (not shown) by cinch subassembly 33 (discussed in more detail below). Specifically, the cinch lever assembly 42 can be mounted onto housing 29 via frame mounting portions (e.g., mounting holes, mounting pins, etc.). The rotary actuator system (not shown) is coupled to a cinch lever assembly 42 (e.g., cinch lever 21 and cinch link lever 22) via cinch cable 61 as further described below. As such, the rotary actuator system can actuate (e.g., pull or cinch) cinch link lever 22 by acting on cinch lever 21 to cinch the closure panel 16 from a partially closed position to a fully closed position, as the cinch link lever 22 can act on ratchet 24 via a cinch lever 21 (see FIGS. 2-12).

As shown in FIGS. 2-12, latch assembly 20 also includes cinch subassembly 33 operatively coupled to the cinch lever assembly 42. Cinch subassembly 33 includes a pulley 50 mounted on housing 29 and a cable 53 for actuating the cinch lever 21 when coupled thereto. The cinch subassembly 33 also includes a cable attachment bracket 55 hingedly coupled to the housing 29 at a hinge point 72 and a cinch cable 61 for coupling to the rotary actuator system.

Pulley 50 is mounted to housing 29 via pivot 71. Pulley 50 freely rotates around an axis of rotation defined by pivot 71 within housing 29. Pulley 50 guides cinch cable 61 to a predefined path in any direction. In the embodiment shown in FIGS. 2-12, cable 53 passes over pulley 50 between cinch lever 21 and cable attachment bracket 55. In the embodiments shown in FIGS. 2-5, cable 53 is therefore oriented downward once passing over pulley 50 for attaching to rotary actuator system (not shown). For example, pulley 50 can be hinged (e.g. on a rivet) to a frame plate of the latch assembly (e.g., housing 29), a back plate of the latch assembly 20 or to any latch fixed component that provides the pulley 50 enough space to rotate within housing 29. In this manner, cable 53 can be oriented and positioned without affecting the soft close kinematics of the latch assembly 20 (e.g., cinch lever 21 and cinch link lever 22). Furthermore, positioning pulley 50 as described can facilitate efficient packaging of latch assembly 20.

Cable attachment bracket 55 is hingedly coupled to housing 29 and positioned adjacent to pulley 50 such that cable attachment bracket 55 can rotate and/or pivot about hinge point 72. In one example embodiment shown in FIGS. 2-5, cable attachment bracket 55 can also rotate about an axis of rotation of pulley 50 (e.g., pivot 71), where hinge point 72 and an axis of rotation of pulley 50 (e.g., pivot 71) are the same. A hinging motion or rotation of cable attachment bracket 55 about hinge point 72 variably orients cable 53 such that cable 53 can attach to the rotary actuator system (not shown) in a direction differing from an attachment direction of cable 53 to cinch lever assembly 42 (e.g., cinch lever 21; see variable angles provided in FIGS. 2-5). In other words, the cinch subassembly 33 can freely move between a plurality of positions relative to the housing 29 to accommodate a plurality of orientations of the cable 53.

Cable 53 can be a Bowden cable, where a Bowden cable is a flexible cable used to transmit mechanical force or energy by the movement of an inner cable 58 (typically made of steel or stainless steel) relative to a hollow outer cable housing 59. Cable couple 60 of cable attachment bracket 55 provides a fixed anchor point for cable 53 such that a mechanical force transmitted via an inner cable 58 of cable 53 is effectively transmitted to the cinch lever assembly 42. Inline hollow bolt 57 (e.g., a "barrel adjuster") can lengthen or shorten the cable housing 59 relative to couple 60 (e.g., a fixed anchor point). Lengthening of cable housing 59 (e.g., turning inline hollow bolt 57 out or in a first direction) tightens inner cable 58 while shortening the cable housing 59 (e.g., turning inline hollow bolt 57 in or in a second direction) loosens inner cable 58.

Cable 53 couples to cinch lever 21 to provide for rotation of the ratchet 24 about the shaft 28 towards and into the cinched position, thus positioning the mating striker 17 in the fully closed position in the slot 13 of the latch assembly 20.

Figure 3:
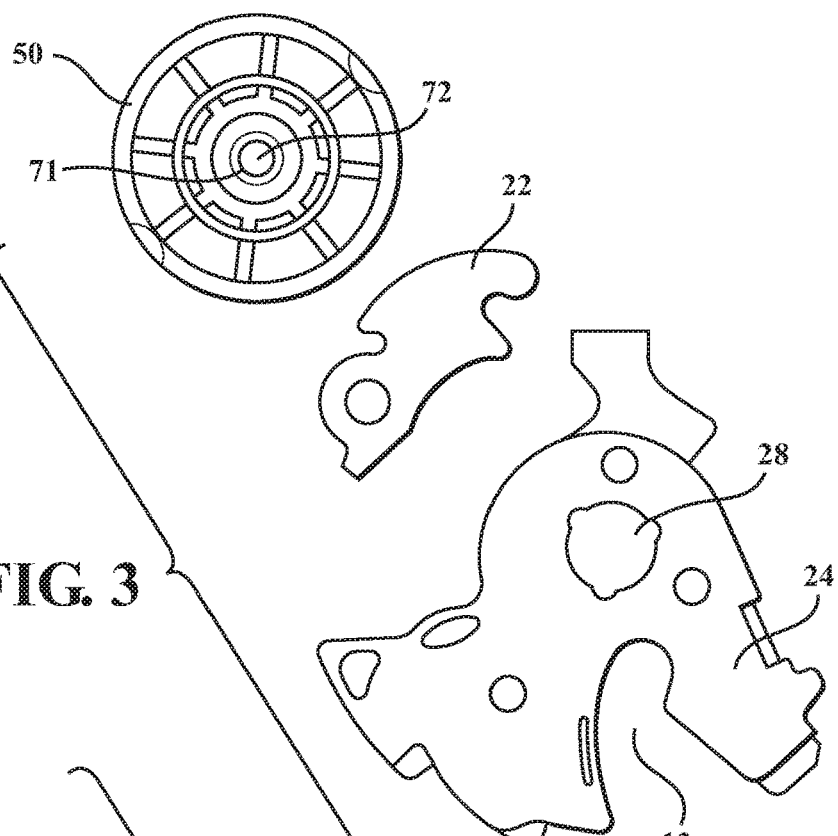
FIG. 3 shows a cross-sectional view of a ratchet, a cinch link lever and a pulley of the latch assembly of FIG. 2 according to aspects of the disclosure.
Figure 4:
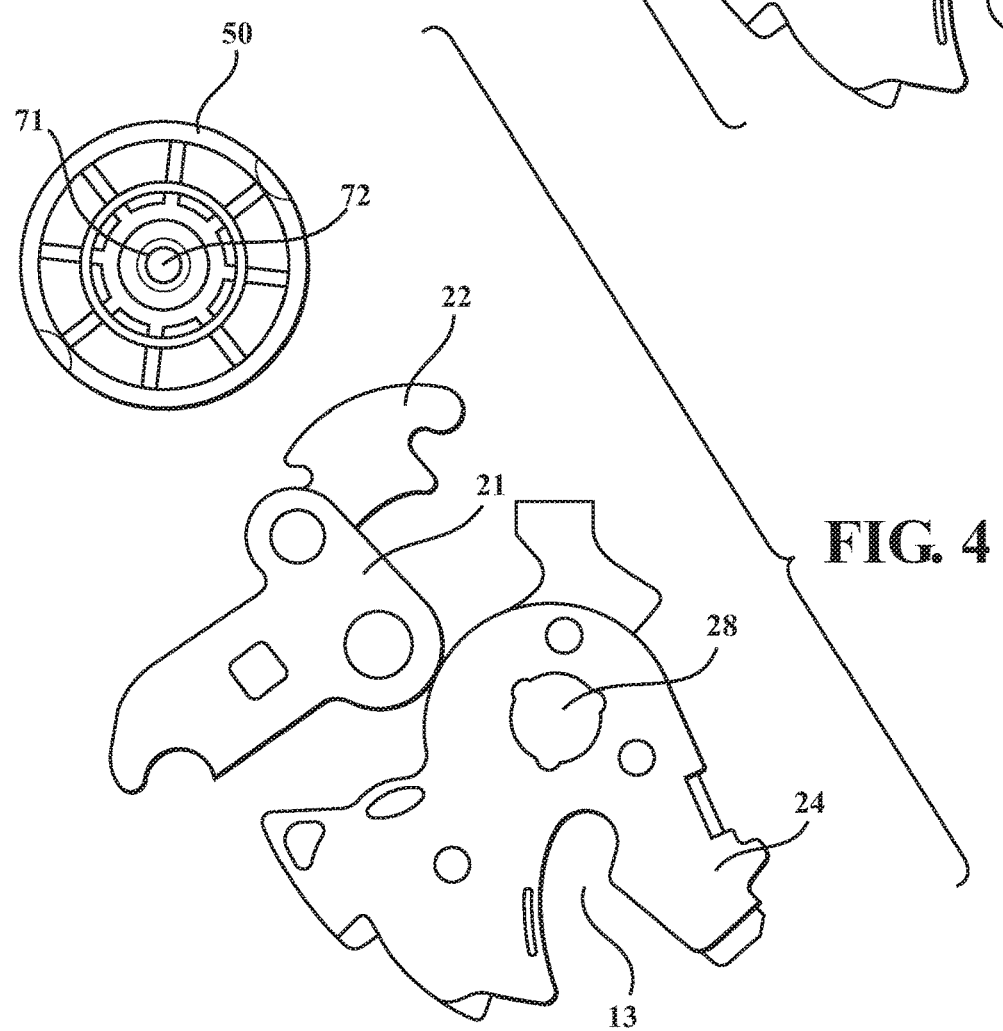
FIG. 4 shows a cross-sectional view of a ratchet, a cinch link lever, a cinch lever and a pulley of the latch assembly of FIG. 2 according to aspects of the disclosure.
Figure 5:
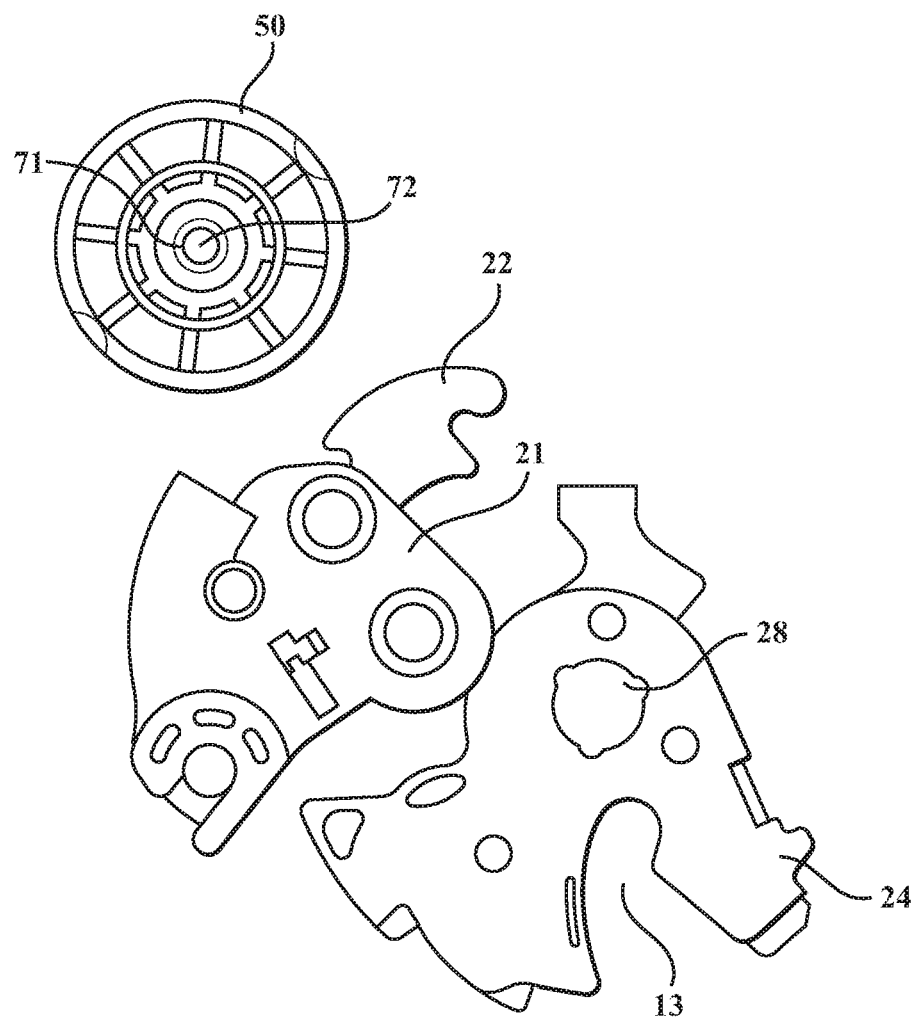
FIG. 5 shows a cross-sectional view of a ratchet, a cinch link lever, a co-moulded cinch lever and a pulley of the latch assembly of FIG. 2 according to aspects of the disclosure.
Figure 6:
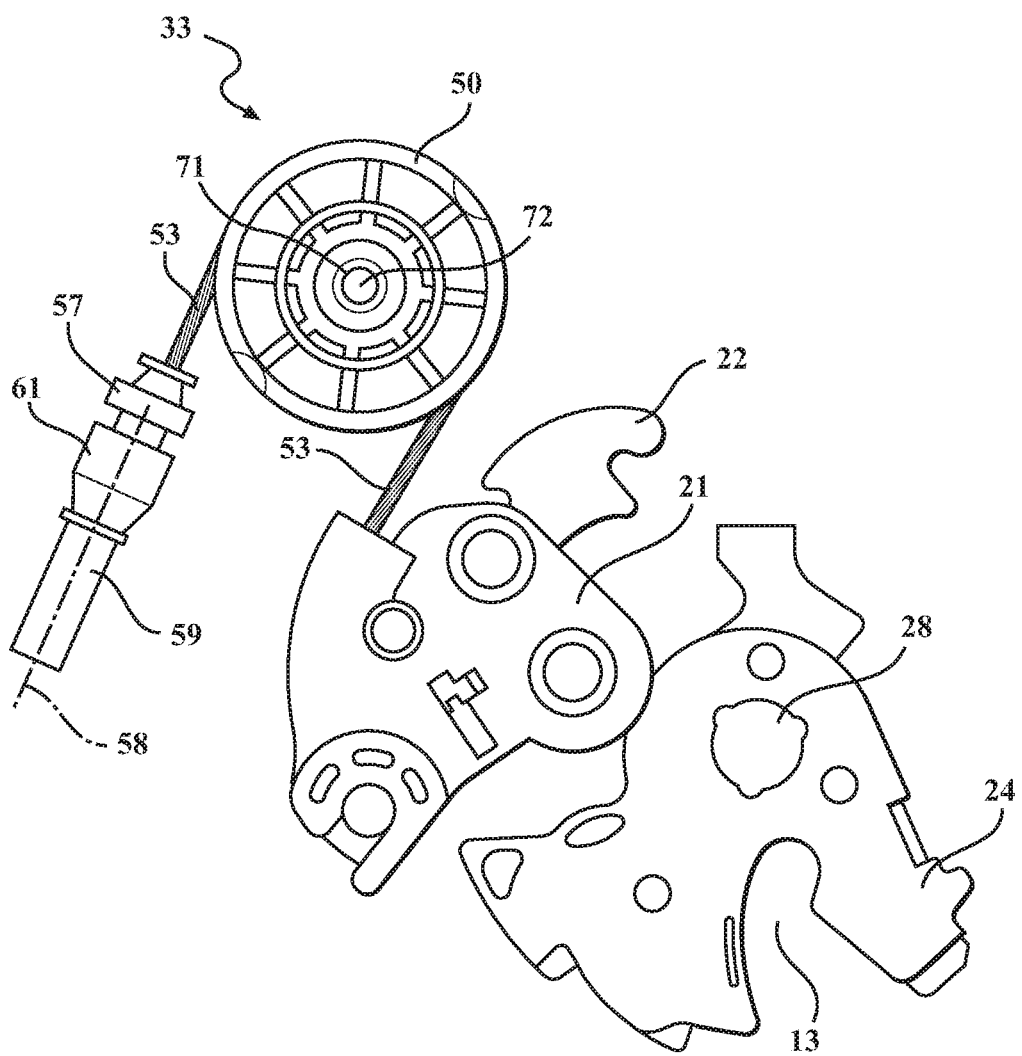
FIG. 6 shows a cross-sectional view of a ratchet, a cinch link lever, a co-moulded cinch lever and cinch components of the latch assembly of FIG. 2 according to aspects of the disclosure.
Figure 7:
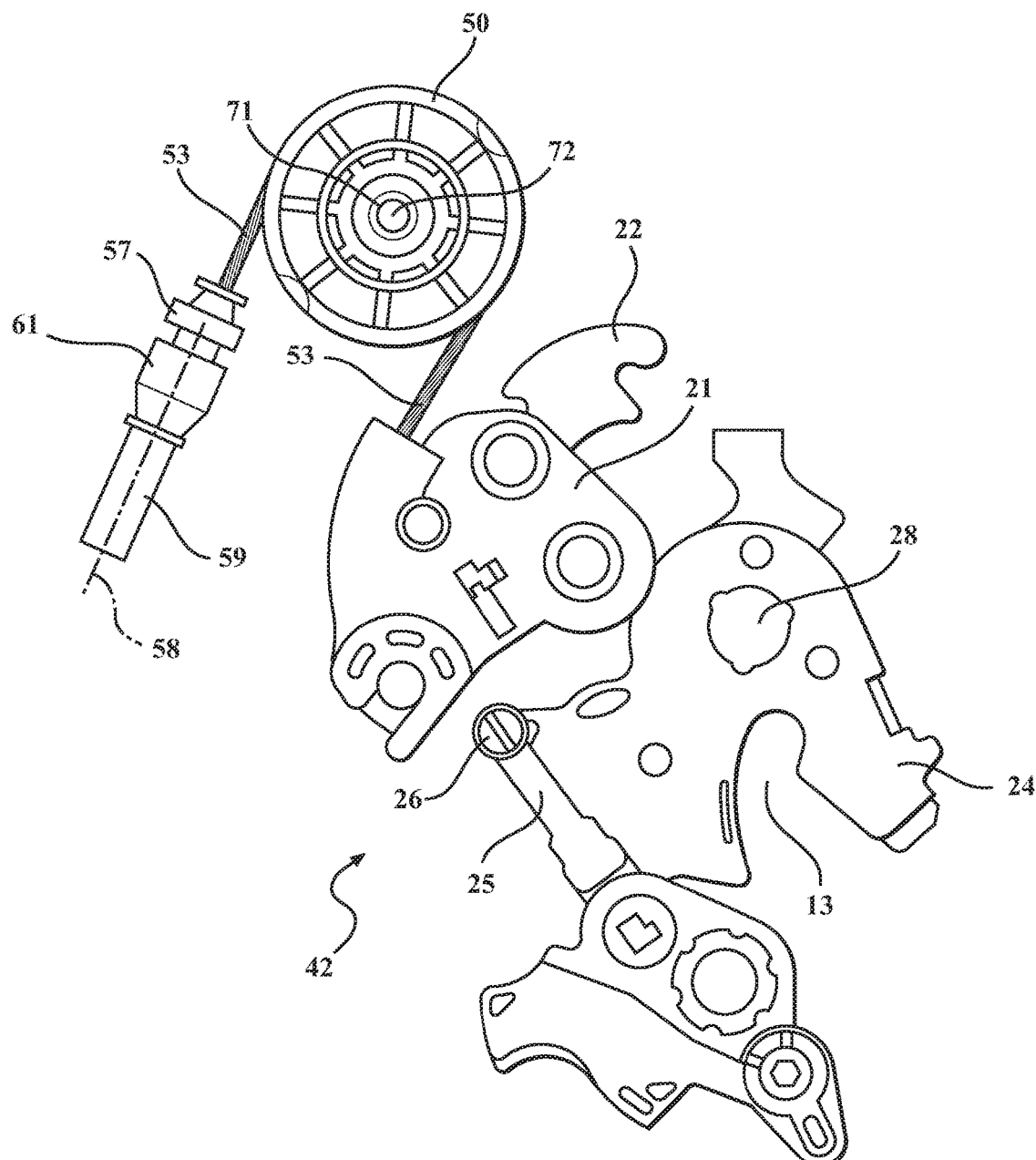
FIG. 7 shows a cross-sectional view of a ratchet, a pawl, a cinch link lever, a co-moulded cinch lever and cinch components of the latch assembly of FIG. 2 according to aspects of the disclosure.
Figure 8:
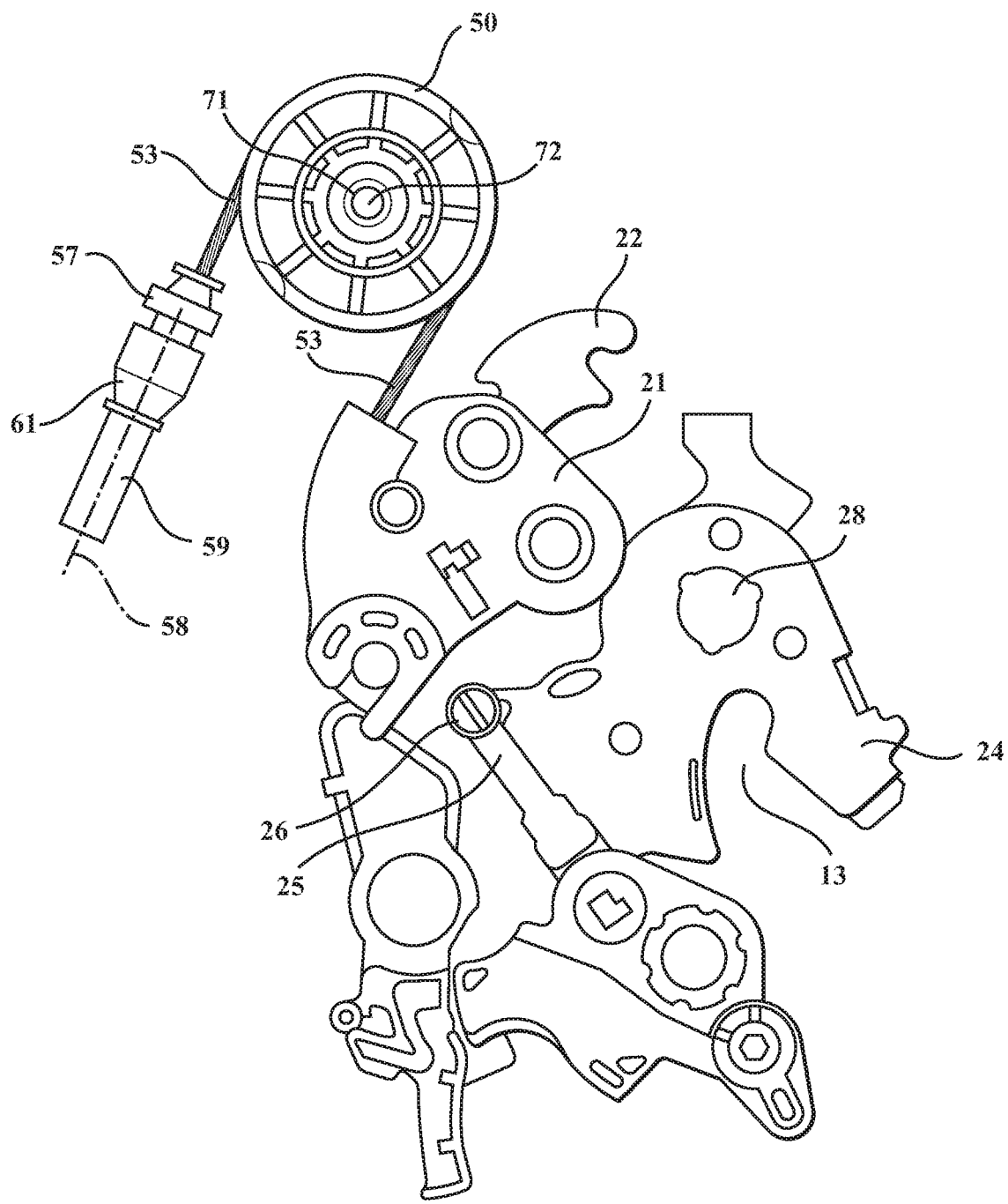
FIG. 8 shows a cross-sectional view of a ratchet, a pawl, a cinch link lever, a co-moulded cinch lever, cinch components and a cinch lever assembly of the latch assembly of FIG. 2 according to aspects of the disclosure.
Figure 9:
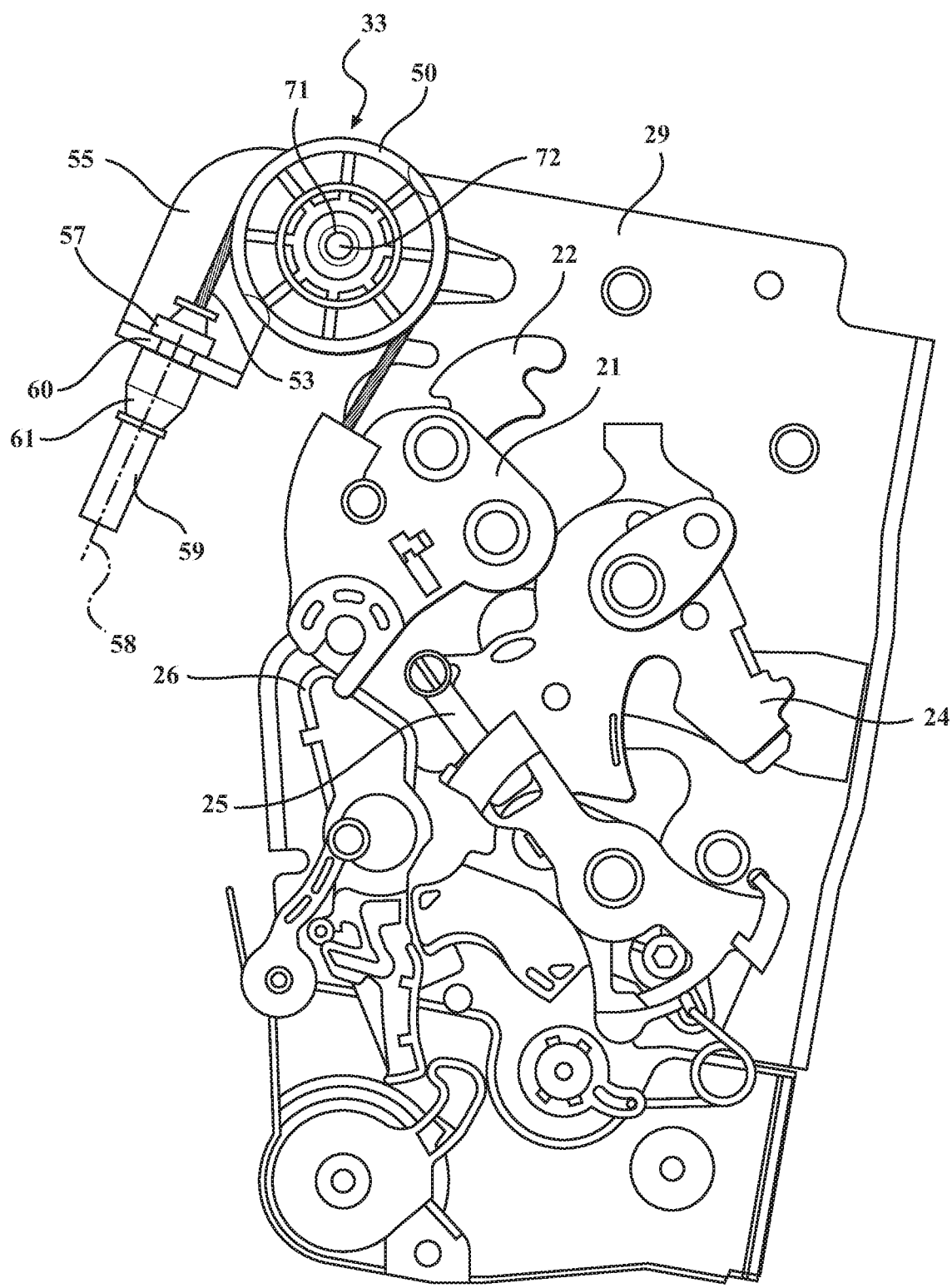
FIG. 9 shows a cross-sectional view of a ratchet, a pawl, a cinch link lever, a co-moulded cinch lever, cinch components, a cinch lever assembly and a housing of the latch assembly of FIG. 2 according to aspects of the disclosure.
Figure 10:
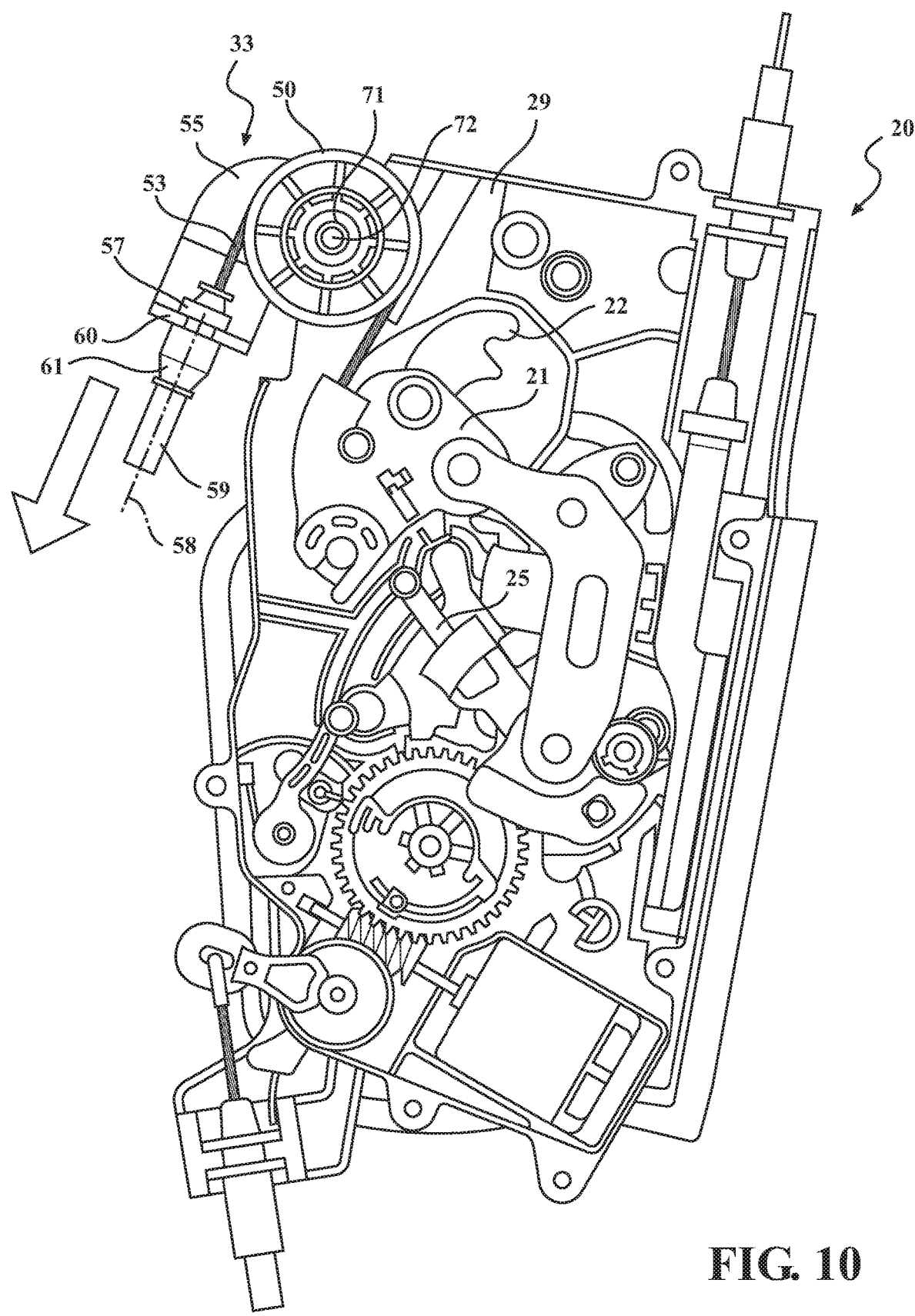
FIG. 10 shows a cross-sectional view of a latch assembly in a second orientation according to aspects of the disclosure.
Figure 11:
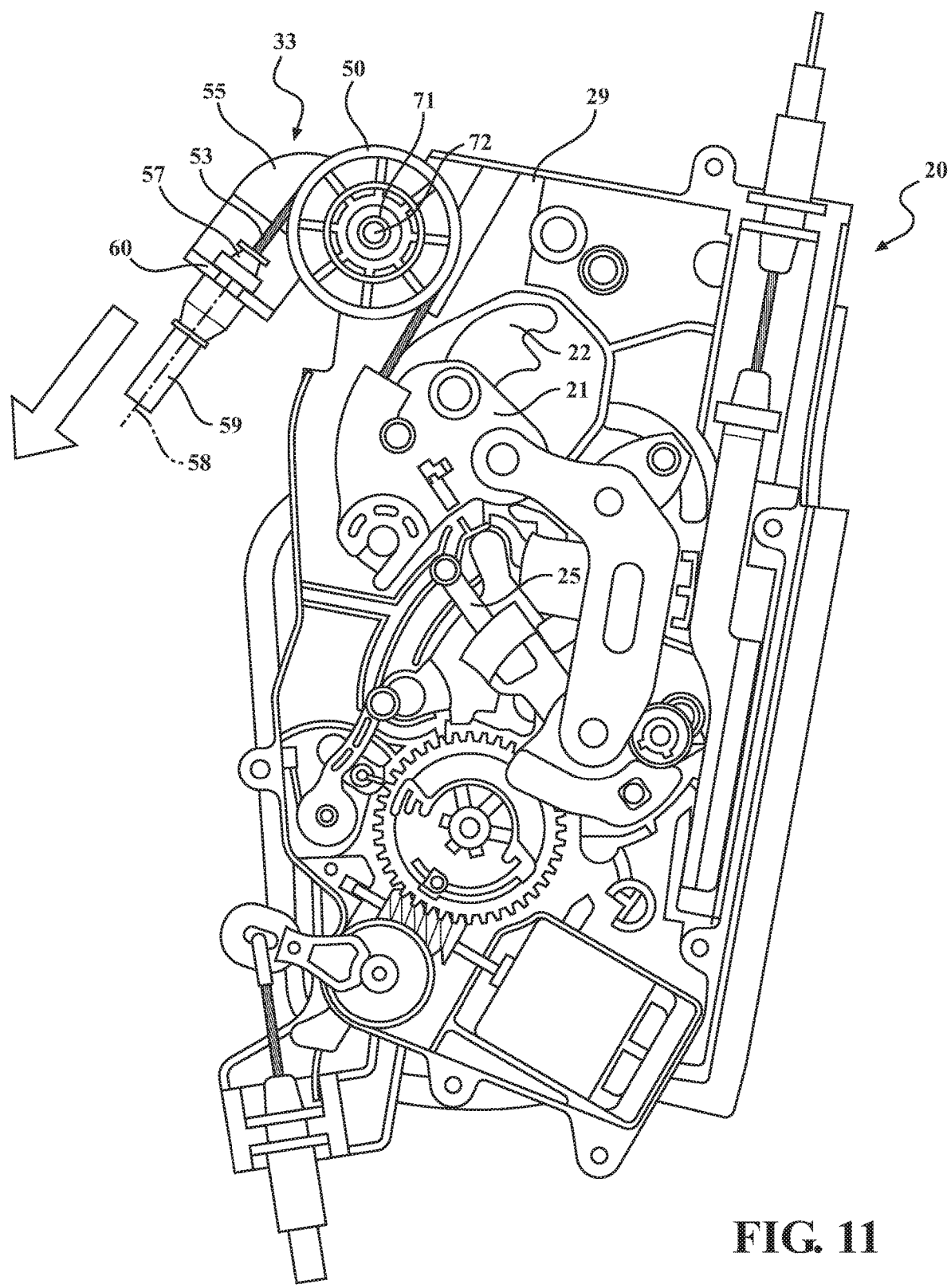
FIG. 11 shows a cross-sectional view of a latch assembly in a third orientation according to aspects of the disclosure.
Figure 12:
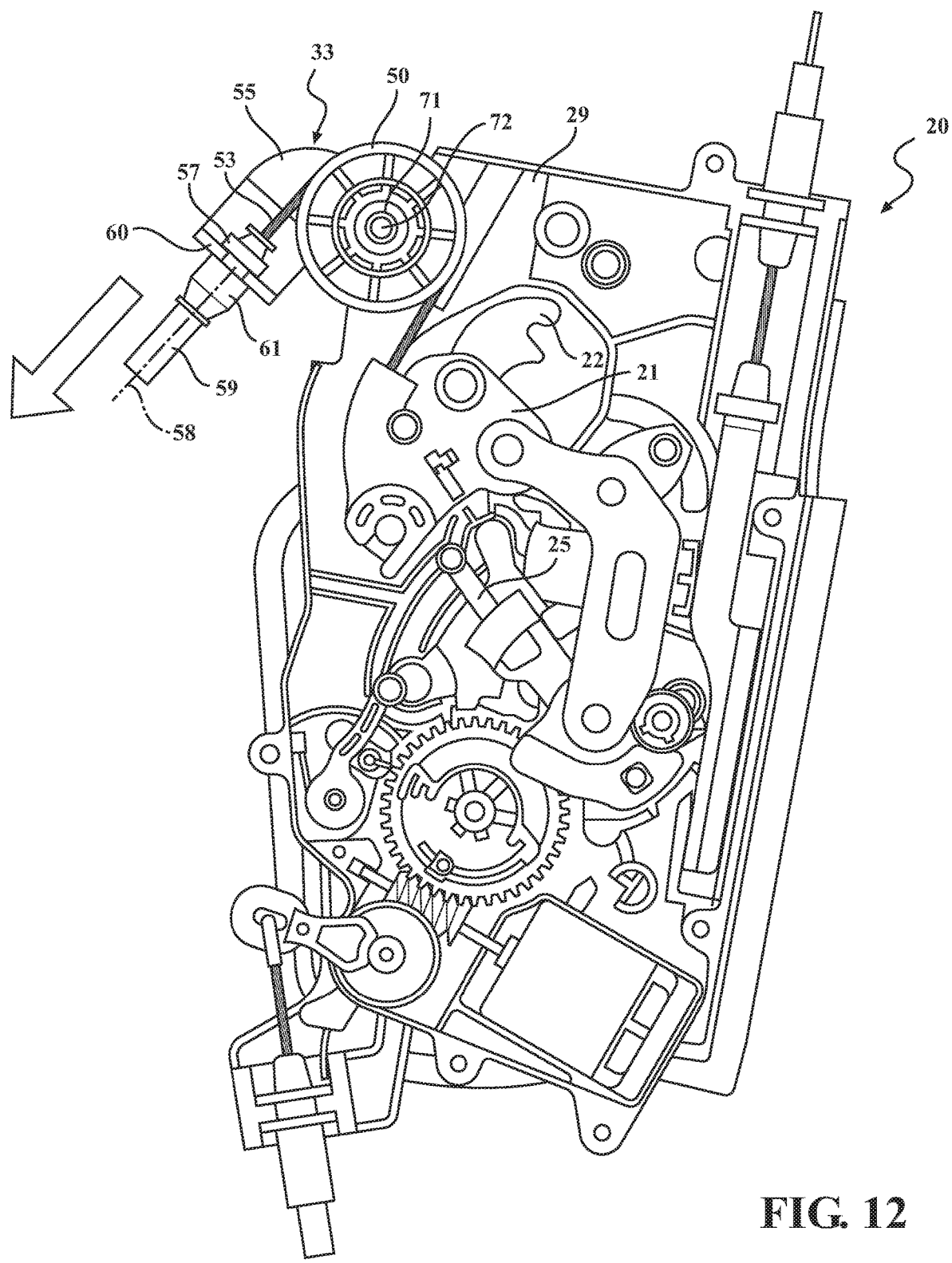
FIG. 12 shows a cross-sectional view of a latch assembly in a fourth orientation according to aspects of the disclosure.

Referring to FIGS. 3-5, cable 53 is shown in various orientations to illustrate free rotation of cable attachment bracket 55 about hinge point 72. In FIG. 3, pulley 50 is shown rotated axially away from latch assembly 20 to orient cable 53 to couple to rotary actuator system (not shown) positioned distal to and below pulley 50 and/or latch assembly 20. FIGS. 4 and 5 show continued rotation of pulley 50 axially away from latch assembly 20. In some embodiments, pulley 50 can rotate to orient cable 53 to couple to rotary actuator system (not shown) positioned laterally from latch assembly 20. The preceding embodiments can facilitate cable 53 orientation when latch assembly 20 is mounted on closure panel 16 adjacent to a window trim (not shown) and a soft close actuator or rotary actuator system is not positioned adjacent to latch assembly 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example switching system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

All publications, patents, and patent applications are herein incorporated by reference in their entirety to the same extent as if each individual publication, patent or patent application was specifically and individually indicated to be incorporated by reference in its entirety.

What is claimed is:

1. A latch assembly for a closure member comprising:
   a housing;
   a ratchet pivotally coupled to said single housing for selectively retaining a striker to secure the closure member;
   a cinch lever assembly coupled to said housing and including a cinch lever for engaging said ratchet and cinching the striker in said ratchet in response to said cinch lever being actuated by a cable coupled to an actuator system not mounted to said latch assembly and coupled to said cinch lever assembly to move the closure panel from a partially closed position to a fully closed position; and
   a cinch subassembly extending from said housing and being operatively coupled to said cinch lever assembly with the cable and configured to freely move between a plurality of positions relative to said housing to accommodate a plurality of orientations of the cable between the actuator system and the cinch subassembly, wherein said cinch subassembly includes a pulley coupled to a fixed component and rotatable about an axis of rotation to guide the cable couple to said cinch lever assembly, wherein said cinch subassembly further includes a cable attachment bracket hingedly coupled to said housing at a hinge point adjacent to said pulley for attaching the cable thereto, and wherein said hinge point of said cable attachment bracket and said axis of rotation of said pulley are the same.

2. A latch assembly as set forth in claim 1, wherein said fixed component is said housing.

3. A latch assembly as set forth in claim 1, wherein said cable attachment bracket includes a cable couple for providing a fixed anchor point for the cable coupled to said cinch lever assembly.

4. A latch assembly as set forth in claim 3, wherein the cable coupled to the cinch lever assembly includes a cable housing and an inner cable for coupling to said cinch lever and movable relative to the cable housing and wherein the cable housing couples to said cable couple of said cable attachment bracket to provide for a mechanical force transmitted by the inner cable to the cinch lever assembly.

5. A latch assembly as set forth in claim 3, wherein said cable couple extends transversely from said cable attachment bracket.

6. A latch assembly as set forth in claim 1, wherein the cable couples to said cinch lever in an attachment direction and said cinch subassembly is positioned to allow the cable coupled to said cinch lever assembly to be oriented in a direction differing from the attachment direction of the cable to said cinch lever assembly.

7. A latch assembly comprising:
   a housing configured to receive a striker;
   a ratchet including a slot and pivotally mounted on said housing for retaining the striker in a latched position;
   a pawl pivotally mounted on said housing for selectively retaining said ratchet in the latched position;
   a cinch lever assembly mounted on said housing, wherein said cinch lever assembly has a cinch lever for cinching the striker in said slot in response to said ratchet being in the latched position;
   a pulley mounted on said housing and rotatable about an axis of rotation to guide a cable configured to be coupled to an actuator system not mounted to said latch assembly and coupled to said cinch lever assembly in an attachment direction, wherein the cable is for actuating said cinch lever; and
   a cable attachment bracket hingedly coupled to said housing at a hinge point adjacent to said pulley for attaching the cable thereto and thereby variably orienting the cable between the actuator system and the cinch subassembly in a direction differing from the attachment direction of the cable to said cinch lever assembly, wherein said hinge point of said cable attachment bracket and said axis of rotation of said pulley are the same.

8. A latch assembly as set forth in claim 7, wherein said cinch lever of said cinch lever assembly has a cinch link lever for cinching the striker in said slot when in the latched position.

9. A latch assembly as set forth in claim 7, wherein said cable attachment bracket includes a cable couple for providing a fixed anchor point for the cable coupled to said cinch lever assembly.

10. A latch assembly as set forth in claim 9, wherein the cable coupled to the cinch lever assembly includes a cable housing and an inner cable for coupling to said cinch lever and movable relative to the cable housing and wherein the cable housing couples to said cable couple of said cable attachment bracket to provide for a mechanical force transmitted by the inner cable to the cinch lever assembly.

11. A latch assembly as set forth in claim 3, wherein said pulley is between said cable couple and said cinch lever assembly.

12. A latch assembly as set forth in claim 9, wherein said pulley is between said cable couple and said cinch lever assembly.

13. A latch assembly as set forth in claim 1, wherein said cinch subassembly is mounted to said housing.

* * * * *